March 21, 1939.                    F. L. MAIN                    2,151,557
BRAKE MECHANISM
Filed March 23, 1936                2 Sheets-Sheet 1
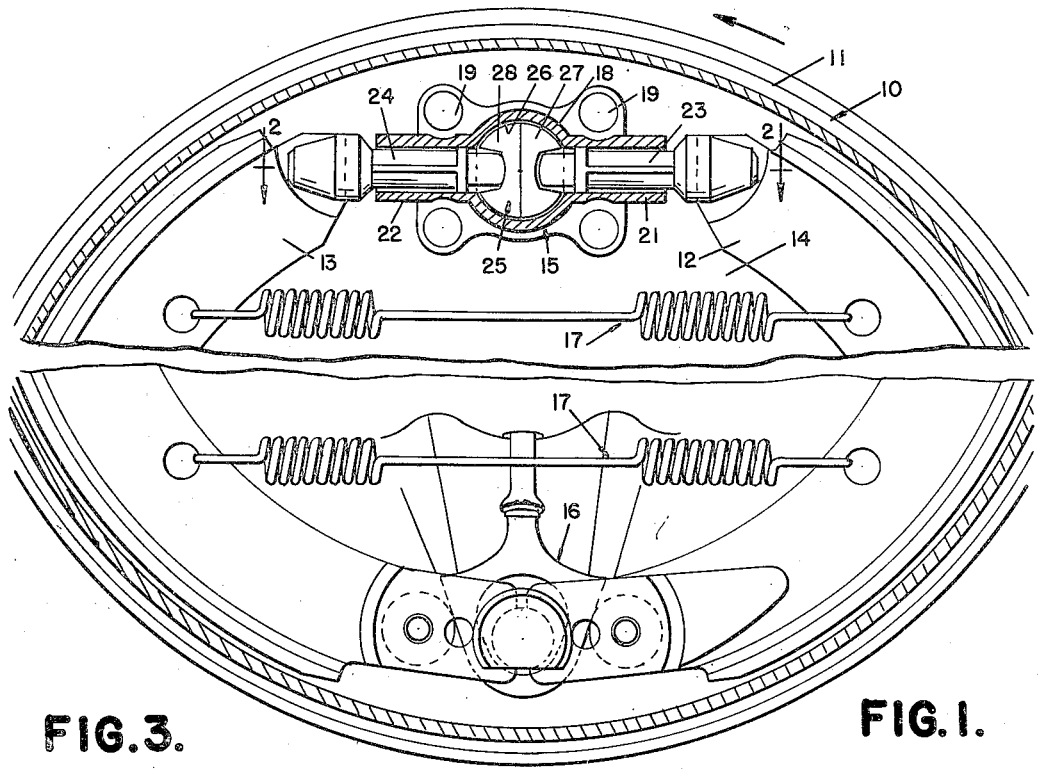
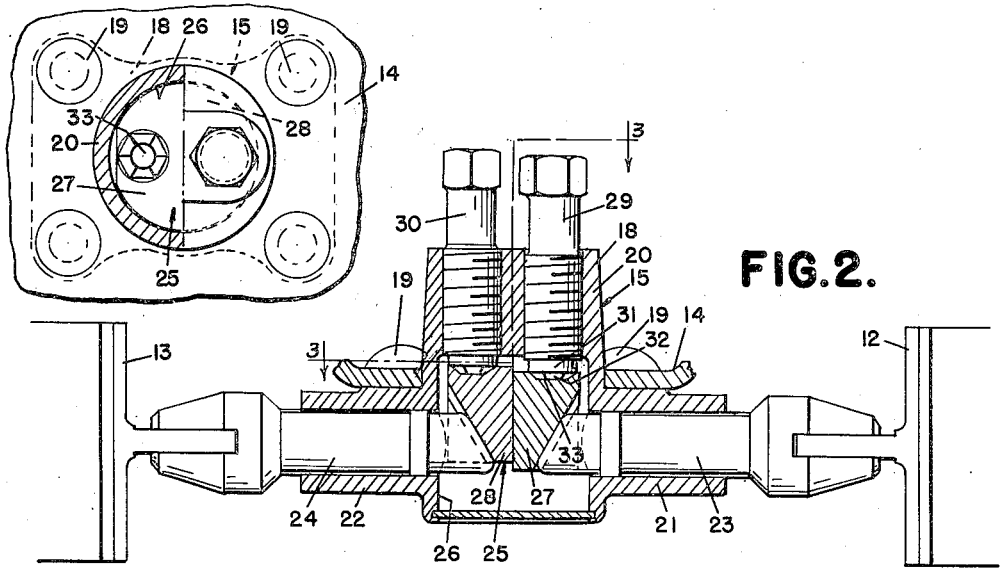
INVENTOR
FRANK L. MAIN March 21, 1939.   F. L. MAIN   2,151,557
BRAKE MECHANISM
Filed March 23, 1936   2 Sheets—Sheet 2
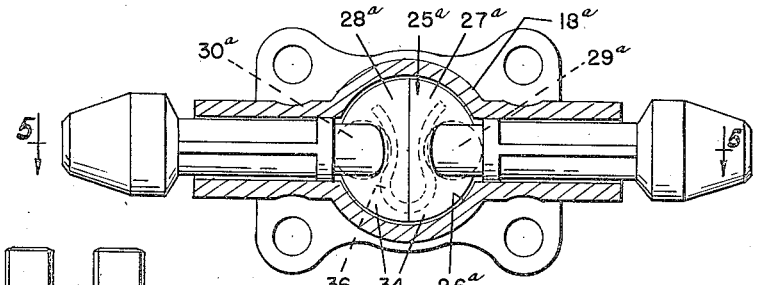
FIG. 4.
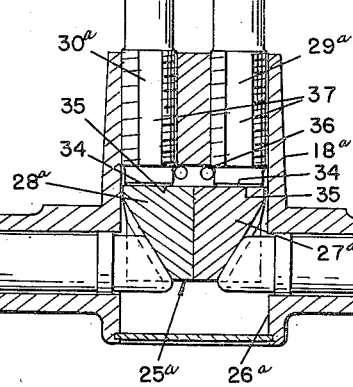
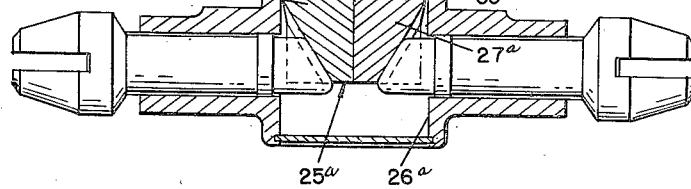
FIG. 5.
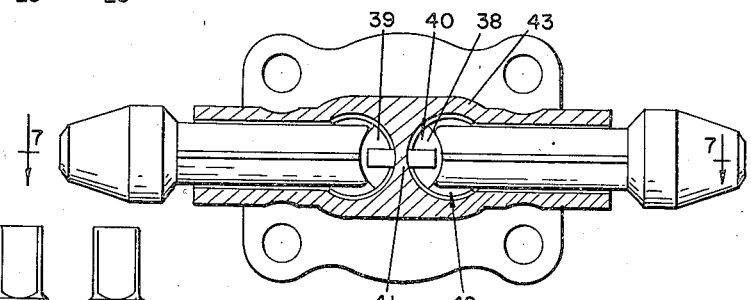
FIG. 6.
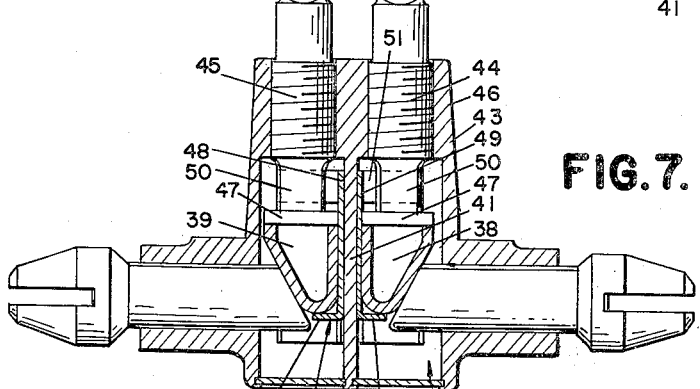
FIG. 7.
INVENTOR
FRANK L. MAIN
ATTORNEYS Patented Mar. 21, 1939

2,151,557

BEST AVAILABLE COPY

UNITED STATES PATENT OFFICE 2,151,557

BRAKE MECHANISM

Frank L. Main, Birmingham, Mich., assignor to Kelsey-Hayes Wheel Company, Detroit, Mich., a corporation of Delaware Application March 23, 1936, Serial No. 70,430

32 Claims. (Cl. 188—79.5)

This invention relates generally to brake mechanisms and refers more particularly to adjustment anchor devices for brake shoes.

One of the principal objects of the present invention resides in the provision of an adjustment anchor device embodying means for independently adjusting the primary and secondary shoes. This construction is advantageous in that it renders it possible to compensate for the differences in wear of the primary and secondary shoes.

Another advantageous feature of the present invention consists in the provision of an anchor adjustment device of the character set forth in the preceding paragraph having provision for imparting controlled servo to the brake mechanism by permitting a limited amount of torque to be transferred therethrough from one shoe to the other.

A further object of this invention is to provide an adjustment anchor device of the above character capable of being inexpensively manufactured, assembled and installed.

The above, as well as other objects, will be made more apparent as this description proceeds, especially when considered in connection with the accompanying drawings, wherein:

Figure 1 is an end elevation, partly in section, of a brake mechanism showing one embodiment of this invention;

Figure 2 is a sectional view taken substantially on the plane indicated by the line 2—2 of Figure 1;

Figure 3 is a sectional view taken substantially on the plane indicated by the line 3—3 of Figure 2;

Figure 4 is an elevational view, partly in section, of a modified form of the present invention;

Figure 5 is a sectional view taken substantially on the plane indicated by the line 5—5 of Figure 4;

Figure 6 is an elevation, partly in section, of a further embodiment of my invention; and Figure 7 is a sectional view taken on the plane indicated by the line 7—7 of Figure 6.

The brake mechanism disclosed in Figures 1 to 3 inclusive, comprises a brake drum 10 having an annular brake flange 11 and having shoes 12 and 13 located within the drum for engagement with the inner surface of the brake flange. The brake shoes have spaced ends anchored upon the backing plate 14 of the drum by means of an adjustment anchor device 15 and also have the opposite ends spaced from each other for engagement by a suitable actuator 16 embodying means for forcing the shoes outwardly into frictional contact with the brake flange. In the present instance, the adjustment anchor device 15 is associated with the upper ends of the shoes for anchoring the latter on the backing plate and the actuator 16 is located in operative relationship with the lower ends of the brake shoe. In accordance with conventional practice, suitable springs 17 are connected to the brake shoes for retracting and holding the same in their normal or inoperative positions.

Assuming the brake drum to be rotating in a direction indicated by the arrow in Figure 1, the brake shoe 12 is the primary or leading shoe and the brake shoe 13 is the secondary or trailing shoe. In brakes of this character, the friction lining of the primary shoe 12 usually wears at a faster rate than the friction lining of the secondary shoe and this differential wear in the linings of the two shoes is compensated for by providing means for independently adjusting the two shoes. The manner in which the anchor adjustment device 15 accomplishes this function will be fully understood upon considering the following description of the detailed construction of this device.

As shown in Figure 2, the adjustment anchor device comprises a bracket 18 fixedly secured to the backing plate 14 by means of the rivets 19 and having a hub 20 extending out of the drum through the backing plate. In addition, the bracket 18 is formed with axially aligned tubular portions 21 and 22 located within the drum for respectively slidably receiving the adjustment links 23 and 24. As shown in Figure 1, the outer ends of the adjustment links are provided with head portions slotted to receive adjacent ends of the shoes and the inner ends of the links are engaged by a wedge 25 mounted for axial movement in a bore 26 formed in the bracket 18 between the tubular portions 21 and 22.

It has been previously stated that the lining of the primary shoe wears at a greater rate than the lining of the secondary shoe and that in order to secure an efficient adjustment of the brake shoes, it is necessary to move the primary shoe to a greater extent than the secondary shoe. This is accomplished in the present instance by forming the wedge 25 of two complementary sections 27 and 28. The inner surfaces of the complementary sections are arranged in abutting relation to each other while the outer surface of the section 27 is grooved to slidably receive the inner end of the link 23 for the primary shoe 12, and the outer surface of the other section 28 is likewise grooved to slidably receive the inner end of the link 24 for the secondary shoe 13. The arrangement is such as to permit the complementary sections of the wedge to be moved axially within the bore 26 independent of each other and thereby effect different rates of movement of the shoes to vary the clearance between the latter and adjacent surface of the brake flange 11.

The complementary sections of the wedge 25 are independently adjusted by means of a pair of screws 29 and 30. The outer ends of the screws are provided with polygonally shaped end portions for engagement with a suitable tool, while the shank portions thereof threadedly engage axially extending bores in the hub 20 of the bracket 18. Upon reference to Figure 2, it will be noted that the inner end of the screw 29 is provided with an axially extending portion 31 tapered toward the axis of the screw and having a plurality of flats 32. The portion 31 engages within a correspondingly shaped recess 33 formed in the outer surface of the section 27 of the wedge 25. The inner end of the screw 30 is similarly fashioned and engages within a correspondingly shaped recess in the outer surface of the section 28 of the wedge 25 for axially adjusting this section of the wedge relative to the wedge 27. Attention is called to the fact that the corresponding flats on the inner ends of the screws and on the side walls of the recesses 33 in the complementary sections of the wedge, function to not only lock the sections of the wedge in their various positions of adjustment, but to also indicate predetermined increments of adjustment.

Referring again to Figure 2 of the drawings, it will be noted that the maximum diameter of the wedge 25 is slightly less than the diameter of the bore 26 in the bracket 18 and this difference in diameter controls, to a certain extent, the amount of servo of the brake mechanism. In other words, the wedge 25, in effect, floats circumferentially of the bore 26 and accordingly, torque may be transmitted through the wedge from one shoe to the other. During the transfer of torque from one shoe to the other, the complementary sections of the wedge 25 are cammed axially of the bore 26 by virtue of the cooperating engaging flats on the sections of the wedge and associated screws. However, as soon as the brake is released, the cooperating engaging flats, previously mentioned, serve to center the sections of the wedge in the bore 26 of the bracket 18.

The embodiment of the invention shown in Figures 4 and 5 differs from the one previously described in that the outer ends 34 of the complementary sections 27ª and 28ª of the adjusting wedge 25ª are flat for engagement with the correspondingly flat inner end portions 35 of the screws 29ª and 30ª. The relative adjustment of the complementary sections of the wedge 25ª by the screws is effected in the same manner as previously described in connection with the first form of this invention. In the present instance, however, the parts are maintained in their relative positions of adjustment by means of a spring detent 36 housed in the bracket 18ª and engageable with suitable flats 37 on the screws 29ª and 30ª. This construction also provides for indicating predetermined increments of adjustment.

The wedge 25ª is also capable of limited circumferential displacement in the bore 26ª of the bracket 18ª for the purpose of transferring torque from one shoe to the other. It will be understood that the amount of torque transmitted is controlled by the relative difference in diameter of the wedge 25ª and bore 26ª and also by the friction effected at points of engagement of the complementary sections of the wedge with the inner ends of the screws.

The modification illustrated in Figures 6 and 7 differs principally from the foregoing constructions in that the complementary sections 38 and 39 of the adjusting wedge 40 are separated from each other by means of a partition 41 extending axially of the bore 42 in the anchor bracket 43. In effect, the partition 41 divides the bore 42 into two cylinders and the adjacent inner walls of the complementary sections of the wedge are arcuate in cross section so as to be guided throughout their axial adjustment by the partition. The two complementary sections of the wedge 40 are independently moved axially of the two cylinders by means of the screws 44 and 45. Upon reference to Figure 7, it will be noted that the screws are threadedly mounted in the hub 46 of the bracket 43 and the inner ends of the screws are provided with enlarged heads 47 respectively engageable with the outer ends of the complementary sections 38 and 39 of the wedge 40.

In the present instance, the complementary sections of the wedge are maintained in their various adjusted positions and predetermined increments of adjustment of these wedges are indicated by the cooperation of spring metal members 48 and 49 with the flats 50 on each of the screws. In detail, the spring metal member 49 is semi-cylindrical and is located in the cylinder for the section 38 of the wedge between the latter and partition, in the manner clearly shown in Figure 7. As will be observed from this latter figure, a tongue 51 on the inner end of the member 49 is bent laterally over the inner end of the section 38 of the wedge and the outer end of the member 49 extends beyond the corresponding end of the section 38 for engagement with the flats 50 on the screw 44. The spring metal member 48 is associated with the wedge section 39 and is of similar construction.

The construction of the embodiment of the invention shown in Figures 6 and 7 is particularly advantageous in cases where it is not desired to transfer torque from one shoe to the other through the adjustment wedge. However, this embodiment, like the foregoing modifications, provides for adjusting the shoe at a different rate to compensate for differences in the wear of the linings of the shoes.

What I claim as my invention is:

1. In a brake mechanism, a brake drum having an annular brake flange, shoes supported within the drum and having spaced ends, means for independently adjusting the shoes to vary the clearance between the latter and brake flange, said means including a pair of members supported for movement transversely of the brake shoes between the ends of the shoes at one side of the drum and respectively operable to move the latter outwardly, and separate means for independently actuating the members.

2. In a brake mechanism, a brake drum having an annular brake flange, shoes supported within the drum and having spaced ends, means for independently adjusting the shoes to vary the clearance between the latter and brake flange, said means including a bracket fixed relative to the drum and having a bore extending substantially parallel to the axis of the drum between the ends aforesaid of the shoes, a pair of members movable independently of each other in said bore for respectively adjusting the ends of the shoes outwardly, and separate adjustable elements for independently actuating the members.

3. In a brake mechanism, a brake drum having an annular brake flange, shoes supported within the drum and having spaced ends, means for independently adjusting the shoes to vary the clearance between the latter and brake flange, said means including a bracket fixed relative to the drum and having a bore extending substantially parallel to the axis of the drum between the ends aforesaid of the shoes, a pair of members movable independently of each other in said bore for respectively adjusting the ends of the shoes outwardly, and a pair of members threadedly mounted in said bracket and respectively engageable with the members for independently actuating the latter.

4. In a brake mechanism, a brake drum having an annular brake flange, shoes supported within the drum and having spaced ends, means for independently adjusting the shoes to vary the clearance between the latter and brake flange, said means including a wedge movable transversely of the brake shoes between said ends and comprising a pair of sections respectively operable to move the ends of the shoes outwardly, and separate members for independently actuating the sections of the wedge.

5. In a brake mechanism, a brake drum having an annular brake flange, shoes supported within the drum and having spaced ends, means for independently adjusting the shoes to vary the clearance between the latter and brake flange, said means including a bracket fixed relative to the drum and having a bore extending substantially parallel to the axis of the drum between the ends aforesaid of the shoes, a wedge movable axially of the bore and comprising a pair of complementary sections respectively operable to move the ends of the shoes outwardly, and separate members supported in the bracket for axial movement and respectively engageable with the complementary sections aforesaid of the wedge to independently actuate said sections.

6. In a brake mechanism, a brake drum having an annular brake flange, shoes supported within the drum and having spaced ends, means for independently adjusting the shoes to vary the clearance between the latter and brake flange, said means including a pair of members supported for movement transversely of the brake shoes between said ends and respectively operable to move the latter outwardly, separate means for independently actuating the members, and means for maintaining the members in their various positions of adjustment and for indicating predetermined increments of adjustment of both members.

7. In a brake mechanism, a brake drum having an annular brake flange, shoes supported within the drum and having spaced ends, means for independently adjusting the shoes to vary the clearance between the latter and brake flange, said means including a wedge movable transversely of the brake shoes between said ends and comprising a pair of sections respectively operable to move the ends of the shoes outwardly, separate members for independently actuating the sections of the wedge, and cooperating means on the sections of the wedge and members aforesaid for maintaining both sections in their various positions of adjustment and for indicating predetermined increments of adjustment of both sections.

8. In a brake mechanism, a brake drum having an annular brake flange, shoes supported within the drum and having spaced ends, means for independently adjusting the shoes to vary the clearance between the latter and brake flange, said means including a wedge movable transversely of the brake shoes between said ends and comprising a pair of sections respectively operable to move the ends of the shoes outwardly, and means for actuating the sections of the wedge independently of each other including separate axially movable members having inner end portions tapering toward the axes thereof and provided with flats engageable in correspondingly shaped recesses in the ends of the sections for maintaining both sections in their various positions of adjustment and for indicating predetermined increments of adjustment of both sections.

9. In a brake mechanism, a brake drum having an annular brake flange, shoes supported within the drum and having spaced ends, means for independently adjusting the shoes to vary the clearance between the latter and brake flange, said means including a pair of members movable independently of each other transversely of the shoes between the ends of the latter and having the inner sides slidably engageable with each other, the opposite sides of the members having inwardly inclined portions for respectively moving the ends aforesaid of the shoes outwardly toward the brake flange, and separate actuating means for each member.

10. In a brake mechanism, a brake drum having an annular brake flange, shoes supported within the drum and having spaced ends, means for independently adjusting the shoes to vary the clearance between the latter and brake flange, said means including a bracket fixed relative to the drum and having a bore extending substantially parallel to the axis of the drum between the ends aforesaid of the shoes, a wedge movable axially of the bore and comprising a pair of complementary sections having the inner sides slidably engageable with each other and having the opposite sides respectively operatively connected to the aforesaid ends of the shoes for moving the latter outwardly, and separate actuating means for each section of the wedge.

11. In a brake mechanism, a brake drum having an annular brake flange, shoes supported within the drum and having spaced ends, means for independently adjusting the shoes to vary the clearance between the latter and brake flange, said means including a bracket fixed relative to the drum and having a bore extending substantially parallel to the axis of the drum between the ends aforesaid of the shoes, a pair of members movable independently of each other in said bore for respectively adjusting the ends of the shoes outwardly and also having a limited movement circumferentially of the drum within the bore to provide for the transfer of torque from one shoe to the other, and separate actuating means for each member.

12. In a brake mechanism, a brake drum having an annular brake flange, shoes supported within the drum and having spaced ends, means for independently adjusting the shoes to vary the clearance between the latter and brake flange, said means including a bracket fixed relative to the drum and having a bore extending substantially parallel to the axis of the drum between the ends aforesaid of the shoes, a wedge movable axially of the bore and to a limited extent circumferentially of the bore, said wedge comprising a pair of complementary sections respectively operable to move the ends of the shoes outwardly, and separate members supported in the bracket for axial movement and respectively engageable with the complementary sections aforesaid of the wedge to independently actuate said sections.

13. In a brake mechanism, a brake drum having an annular brake flange, shoes supported within the drum and having spaced ends, means for independently adjusting the shoes to vary the clearance between the latter and brake flange, said means including a pair of members spaced from each other circumferentially of the drum and supported for movement independently of each other transversely of the shoes between the ends of the latter for respectively moving the ends outwardly toward the brake flange, and separate actuating means for each member.

14. In a brake mechanism, a brake drum having an annular brake flange, shoes supported within the drum and having spaced ends, means for independently adjusting the shoes to vary the clearance between the latter and brake flange, said means including a pair of members separated from each other by means of a wall extending axially of the drum in fixed relation thereto between the aforesaid ends of the shoes and movable independently of each other axially of the drum between said ends for respectively moving the latter outwardly, and separate actuating means for each member.

15. In a brake mechanism, a brake drum having an annular brake flange, shoes supported within the drum and having spaced ends, means for independently adjusting the shoes to vary the clearance between the latter and brake flange, said means including a bracket fixed relative to the drum and having a bore extending substantially parallel to the axis of the drum between the ends aforesaid of the shoes, a partition extending axially of the bore dividing the latter into two compartments, a member movable axially in each compartment for moving the ends of the shoes outwardly, and separate actuating means for independently moving said members.

16. In a brake mechanism, a brake drum having an annular brake flange, shoes supported within the drum and having spaced ends, means for independently adjusting the shoes to vary the clearance between the latter and brake flange, said means including a bracket fixed relative to the drum and having a bore extending substantially parallel to the axis of the drum between the ends aforesaid of the shoes, a partition extending axially of the bore dividing the latter into two compartments, a member movable axially in each compartment for moving the ends of the shoes outwardly, and a pair of members rotatably mounted on the bracket for actuating the members independently of each other.

17. In a brake mechanism, a brake drum having an annular brake flange, brake friction means supported within the drum and having spaced ends, means for adjusting the friction means to vary the clearance between the latter and brake flange, said means including a pair of members supported for movement independently of each other transversely of the friction means between the ends of the latter for respectively moving said ends outwardly and also supported for limited shifting movement circumferentially of the drum, and means for moving said members in the transverse direction aforesaid.

18. In a brake mechanism, a brake drum having an annular brake flange, shoes supported within the drum and having spaced ends, means for adjusting the shoes to vary the clearance between the latter and brake flange, said means including a wedge movable transversely of the brake shoes between the ends of the shoes at one side of the drum and comprising complementary sections supported for movement independent of each other to respectively move the shoes outwardly, and means for independently moving said sections in the transverse direction aforesaid.

19. In a brake mechanism, a brake drum having an annular brake flange, shoes supported within the drum and having the ends at one side of the drum spaced from each other, means for adjusting the shoes to vary the clearance between the latter and brake flange, said means including a wedge movable transversely of the brake shoes between said ends and comprising a pair of complementary sections having the adjacent surfaces frictionally engaging each other, said sections supported for independent movement transversely of the shoes and for limited movement as a unit circumferentially of the brake drum, and means between the aforesaid ends of the shoes and sides of the sections of the wedge adjacent said ends effective upon movement of the sections transversely of the shoes to vary the position of the shoes relative to the brake flange.

20. In a brake mechanism, a brake drum having an annular brake flange, shoes supported within the drum and having the ends at one side of the drum spaced from each other, means for adjusting the shoes to vary the clearance between the latter and brake flange, said means including a pair of members supported for movement independent of each other transversely of the shoes between the aforesaid ends of the latter and having portions of the outer sides inclined inwardly, means between the said ends of the shoes and inclined portions of the members effective upon movement of the members transversely of the shoes to vary the clearance between the latter and brake flange, and means for independently adjusting said members.

21. In a brake mechanism, a brake drum having an annular brake flange, shoes supported within the drum and having the ends at one side of the drum spaced from each other, means for adjusting the shoes to vary the clearance between the latter and brake flange, said means including a pair of members restrained from shifting movement circumferentially of the drum in directions toward each other and supported for movement independently of each other transversely of the shoes between the ends aforesaid of the latter, and means between the said ends of the shoes and sides of the members adjacent the ends effective upon movement of the members transversely of the shoes to vary the clearance between the latter and brake flange.

22. In a brake mechanism, a brake drum having an annular brake flange, shoes supported within the drum and having spaced ends, means for adjusting the shoes to vary the clearance between the latter and brake flange, said means including a bracket fixed relative to the drum and having a bore extending substantially parallel to the axis of the drum between the ends aforesaid of the shoes, a partition extending axially of the bore dividing the latter into two compartments, a member supported in each compartment for movement axially of the latter, and means between the said ends of the shoes and sides of the members adjacent the ends effective upon axial movement of the members to vary the clearance between the shoes and brake flange.

23. A vehicle brake comprising a brake anchor plate, a pair of internal expanding brake shoes to be adjusted with respect to each other, an adjustment assembly comprising a brake anchor housing secured to said anchor plate and adjusting means for separating the adjacent ends of the shoes, said adjusting means comprising two independently axially movable blocks bearing against each other along their inner axial faces, and having their outer faces inclined to their axes, each of said blocks being adapted to actuate one of said shoes, and having independent adjustment, whereby the shoes may be independently adjusted.

24. A vehicle brake comprising a brake anchor plate, a pair of internal expanding brake shoes, an adjustment assembly comprising a brake anchor housing secured to said anchor plate, and means carried by said anchor housing for adjusting each of said shoes independently of the other, said means comprising a pair of independently axially movable cam blocks bearing against each other along their inner axial faces, and having inclined outer faces, adapted to actuate the respective shoes, to adjust them independently of each other.

25. A vehicle brake comprising a brake anchor plate, a pair of internal expanding brake shoes to be adjusted with respect to each other, an adjustment assembly comprising a brake anchor housing secured to said anchor plate, anchor studs extending from said anchor housing in a radial plane, said studs engaging respective adjacent shoe ends, and adjusting means adapted to separate the adjacent ends of said studs independently of each other thereby to independently operate on each respective brake shoe to compensate for the unequal wear of the brake shoes.

26. A vehicle brake adjusting mechanism comprising a brake anchor plate, a brake anchor housing secured to said anchor plate, a pair of internal expanding brake shoes to be adjusted with respect to each other, an adjustment assembly comprising anchor studs extending from said anchor housing in a radial plane, adjusting means for separating the adjacent ends of said studs comprising two independently movable blocks bearing against each other along their inner axial face, each of said blocks having an inclined radial groove formed into the circumferential surface for the purpose of receiving the adjacent ends of the anchor studs and acting as wedges therebetween thereby providing for separate adjustment for each shoe.

27. A vehicle brake adjusting mechanism comprising a brake anchor plate, a brake anchor housing secured to said anchor plate, a pair of internal expanding brake shoes to be adjusted with respect to each other, an adjustment assembly comprising a pair of oppositely extending anchor studs having their adjacent ends slidably secured in said anchor housing, said studs being arranged to receive adjacent shoe ends and having inclined flattened bearing surfaces at their adjacent ends, adjusting means interposed between the adjacent ends of said anchor studs comprising two semi-cylindrical blocks bearing against each other along their inner axial face, each of said semi-cylindrical blocks having an inclined radial groove formed into the circumferential surface for reception of said inclined flattened surfaces of the adjacent ends of said anchor studs thereby acting as wedge members between adjacent ends of said anchor studs for independent adjustment of the brake shoes.

28. A vehicle brake adjusting mechanism comprising in combination, a pair of internal expanding brake shoes to be adjusted with respect to each other, a brake anchor plate, a brake anchor housing secured to said plate, a pair of oppositely extending anchor studs having their adjacent ends slidably secured in said anchor housing, said studs being slotted at their opposite ends to receive adjacent shoe ends and having inclined flattened bearing surfaces at their adjacent ends, adjusting means in the form of two independently movable blocks interposed between adjacent ends of said anchor studs, said blocks bearing against each other along their inner axial face and having radial inclined grooves formed in their circumferential surfaces for reception of the adjacent ends of said anchor studs, threaded members extending axially into said brake anchor housing, the inner ends of said threaded members bearing upon the radial end faces of said blocks to slowly reciprocate the same, one independently of the other as said threaded members are rotated thereby providing for the separate adjustment of each brake shoe.

29. A vehicle brake comprising a pair of internal expanding brake shoes, an adjustment assembly arranged between adjacent ends of said shoes, said adjusting means comprising two independently axially movable blocks bearing against each other along their inner axial faces, and having their outer faces inclined to their axes, each of said blocks being adapted to actuate one of said shoes, and having independent adjustment, whereby the shoes may be independently adjusted.

30. In a brake mechanism, a brake drum having a brake flange, brake shoes within the drum engageable with the brake flange and having spaced ends, means for adjusting the shoes to vary the clearance between the same and the brake flange, said means including members supported for movement independently of each other transversely of the shoes between the ends of the latter for respectively moving said ends outwardly, and means for moving said members.

31. In a brake mechanism, a brake drum having a brake flange, shoes supported within the drum for engagement with the brake flange and having different rates of wear, and relatively movable members supported between the ends of the shoes at one side of the drum for adjusting said shoes relative to the brake flange throughout different distances determined by the differences in wear between the brake shoes.

32. In a brake mechanism, a brake drum having a brake flange, shoes supported within the brake drum for limited circumferential movement relative to the drum and having different rates of wear, and means located between the ends of the shoes at one side of the drum for adjusting the shoes relative to the brake flange throughout different distances determined by the differences in wear between the shoes, said adjusting means being shiftable circumferentially of the drum as a unit with the shoes.

FRANK L. MAIN.